(12) United States Patent
Spinelli et al.

(10) Patent No.: US 10,834,941 B2
(45) Date of Patent: *Nov. 17, 2020

(54) DE-OILING FOR PLANT-BASED PROTEIN EXTRACTION

(71) Applicant: Nutriati, Inc., Henrico, VA (US)

(72) Inventors: Michael A Spinelli, Moseley, VA (US); Krisan Singh, Midlothian, VA (US); Reinhold Brand, Henrico, VA (US)

(73) Assignee: NUTRIATI, INC., Henrico, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/288,314

(22) Filed: Feb. 28, 2019

(65) Prior Publication Data

US 2019/0191736 A1 Jun. 27, 2019

Related U.S. Application Data

(63) Continuation of application No. 15/014,882, filed on Feb. 3, 2016, now Pat. No. 10,264,805, which is a
(Continued)

(51) Int. Cl.
*A23J 1/14* (2006.01)
*A23J 3/34* (2006.01)
(Continued)

(52) U.S. Cl.
CPC ............... *A23J 1/14* (2013.01); *A23J 1/148* (2013.01); *A23J 3/14* (2013.01); *A23J 3/346* (2013.01);
(Continued)

(58) Field of Classification Search
CPC .. A23P 1/06; A23P 10/00; A23P 30/00; A23P 1/00; A23P 1/14; A23P 1/42;
(Continued)

(56) References Cited

U.S. PATENT DOCUMENTS 2,192,212 A * 3/1940 Wagner ............... A23B 5/02
127/68
2,467,402 A * 4/1949 Pascal ................. C08L 3/00
106/125.1
(Continued)

FOREIGN PATENT DOCUMENTS

EP 0943245 A1 9/1999
GB 2136667 A 9/1984
(Continued)

*Primary Examiner* — Joseph W Drodge
(74) *Attorney, Agent, or Firm* — Bechen PLLC; Timothy J. Bechen

(57) ABSTRACT

A method and system provides for for de-oiling and extracting protein from chickpeas prior to generating chickpea protein concentrate. The method and system includes receiving a chickpea flour generated from the chickpeas, including having cortex material removed from the chickpeas and generating an ethanol mixture by mixing the chickpea flour with ethanol to remove at least a portion of the oil content from the chickpea flour. The method and system includes separating the ethanol mixture into a de-oiled chickpea flour and an ethanol recycling stream having organics from the chickpea flour absorbed therein. Therein, the method and system includes extracting a protein concentrate from the de-oiled flour.

17 Claims, 10 Drawing Sheets

Related U.S. Application Data continuation-in-part of application No. 14/997,744, filed on Jan. 18, 2016, now Pat. No. 10,182,590, which is a continuation-in-part of application No. 14/694,341, filed on Apr. 23, 2015.

(51) Int. Cl.

| | | |
|---|---|---|
| *A23J 3/14* | (2006.01) | |
| *B02B 3/14* | (2006.01) | |
| *B01D 11/02* | (2006.01) | |
| *B07B 7/00* | (2006.01) | |
| *A23L 11/30* | (2016.01) | |

(52) U.S. Cl.
CPC .............. *A23L 11/31* (2016.08); *A23L 11/32* (2016.08); *A23L 11/33* (2016.08); *B01D 11/028* (2013.01); *B01D 11/0284* (2013.01); *B02B 3/14* (2013.01); *B07B 7/00* (2013.01)

(58) Field of Classification Search
CPC .... A23P 1/148; A23P 1/16; A23P 3/00; A23P 3/14; A23P 3/16; A23P 3/346; A23L 5/20; A23L 5/23; A23L 5/30; A23L 5/51; A23L 7/10; A23L 7/115; A23L 7/117; A23L 13/30; A23L 13/42; A23L 13/426; A23L 11/31; A23L 11/33; A23L 11/32; B01D 11/02; B01D 11/028; B01D 11/0284; B01D 21/01; B01D 21/26; B01D 21/262; C07K 1/14; C07K 1/145; C07K 1/30; C07K 14/415; C07K 14/426; A23J 1/14; A23J 1/148; A23J 3/14; A23J 3/346; A23J 1/144; B02B 3/14; B07B 7/00; B07B 4/00; B07B 7/01; B07B 7/02; B07B 7/08; B07B 7/10; B07B 11/06; B07B 13/04; B07B 13/05; B07B 13/14; B07B 13/16; A23V 2250/548; A23V 2300/31; A23V 2300/14; A23V 2300/38; A23V 2002/00; A23V 2300/10; B03B 1/00; B03B 1/02; B03B 1/04; B03B 5/48; B03B 7/00; B03B 9/00
USPC .... 210/173, 195.1, 202, 205, 206, 259, 260, 210/512.1, 513, 634, 702, 712, 723, 724, 210/770, 774, 787, 804–806; 99/485, 99/495, 509–513, 516, 518, 540, 542, 99/544, 584, 646, 646 R, 646 S; 241/6–12, 38; 426/425, 429, 443, 465, 426/472, 481, 482, 484, 622, 629, 634, 426/656; 554/9, 12–14, 31, 175

See application file for complete search history.

(56) References Cited

U.S. PATENT DOCUMENTS

| | | | | |
|---|---|---|---|---|
| 2,502,484 | A * | 4/1950 | Saunders | C11B 1/108 530/377 |
| 3,734,901 | A * | 5/1973 | Hayes et al. | A23J 1/142 530/378 |
| 4,144,229 | A * | 3/1979 | Karnofsky | A23J 1/142 530/378 |
| 5,112,637 | A * | 5/1992 | Hron, Sr. | C11B 1/10 426/331 |
| 6,132,795 | A * | 10/2000 | Holbrook | A23C 9/1315 426/634 |
| 7,566,690 | B2 * | 7/2009 | Wu | A23L 33/18 514/1.1 |
| 10,182,590 | B2 * | 1/2019 | Spinelli | B01D 11/028 |
| 10,264,805 | B2 * | 4/2019 | Spinelli | A23J 1/14 |
| 2004/0013790 | A1 | 1/2004 | Anderson | |
| 2008/0069922 | A1 | 3/2008 | Anderson | |
| 2008/0260902 | A1 * | 10/2008 | Van Houten | A23D 9/00 426/18 |
| 2009/0011084 | A1 * | 1/2009 | Liang | C12N 15/8254 426/53 |
| 2009/0176001 | A1 | 7/2009 | Knowlton et al. | |
| 2010/0056470 | A1 * | 3/2010 | Taylor | C07H 15/256 514/54 |
| 2010/0181765 | A1 * | 7/2010 | More | F01N 13/10 285/370 |
| 2010/0281765 | A1 * | 11/2010 | Schwartz | A23J 1/14 44/451 |
| 2013/0066048 | A1 * | 3/2013 | Raskin | A61K 36/48 530/350 |
| 2013/0196028 | A1 * | 8/2013 | Marko | A23C 11/103 426/46 |
| 2015/0230497 | A1 * | 8/2015 | Segall | A23J 1/14 426/262 |
| 2015/0245645 | A1 * | 9/2015 | Raskin | A23L 1/3002 426/590 |
| 2015/0305390 | A1 * | 10/2015 | Vrljic | A23L 27/26 426/574 |
| 2016/0135485 | A1 * | 5/2016 | Krishnan | A23L 7/197 426/640 |
| 2016/0309743 | A1 * | 10/2016 | Spinelli | A23J 1/14 |
| 2016/0309744 | A1 * | 10/2016 | Spinelli | A23J 3/346 |

FOREIGN PATENT DOCUMENTS

| | | |
|---|---|---|
| WO | WO 200213633 | 2/2002 |
| WO | WO 2014115067 | 7/2014 |

* cited by examiner

DE-OILING FOR PLANT-BASED PROTEIN EXTRACTION

RELATED APPLICATIONS

The present application is a continuation of, and claims priority to, U.S. patent application Ser. No. 15/014,882 entitled "DRY FRACTIONATION FOR PLANT BASED PROTEIN EXTRACTION" filed Feb. 3, 2016, which is a continuation-in-part of, and claims priority to, U.S. patent application Ser. No. 14/997,744 entitled "ETHANOL DE-OILING FOR PLANT BASED PROTEIN EXTRACTION" filed Jan. 18, 2016, which is a continuation-in-part of, and claims priority to, U.S. patent application Ser. No. 14/694,341 entitled "PLANT BASED PROTEIN EXTRACTION METHOD AND SYSTEM" filed Apr. 23, 2015.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The disclosed technology relates generally to processing plant-based food items for the extraction of protein and more specifically to a method and system for extracting protein, and other outputs, from chickpeas.

BACKGROUND

Modern food processing trends provide for greater access to macronutrients naturally present in foods. With the growth of consumer demand for high quality food, there is a related growth for improved food processing techniques to extract high-quality macronutrients consistent with consumer beliefs.

For example, it is common for users to require food sources to be organic and composed of ingredients that are non-genetically modified (non-GMO). Another example are consumers seeking to avoid particular food sources, such as consuming a plant-based diet.

In addition to demand for food types being driving by consumer choice, such choices are additionally fueled by consumer intelligence to allergic or inflammatory responses. It is not uncommon for a person to an some adverse reaction to a food source, with severity of reaction differing widely between consumers.

Amongst the macronutrients, protein remains the quintessential macronutrient for the promotion of growth and health maintenance. While protein is readily available and commonly found in many food sources, extraction as a supplement for manufactured food sources can be problematic in seeking specialized solutions.

A common protein supplements from non-plant based sources is whey protein, usable as an example of the concerns of modern protein source manufacturing. The quality of the protein product is directly related to the quality of the original source of protein, thus problems can arise from the quality of the original source. Another problem is whey protein is unavailable to vegan and other non-plant-based consumers.

Another problem is that protein quality and other attendant factors are directly affected by the manufacturing/extraction process. One attendant factor can be the absorption factor of the protein by the user, whether the protein is a quickly-digestible/absorbing protein.

The most common form of plant-based protein is soy protein. While serving several market needs, there exists a need for a wider variety of protein-types and a greater degree of stability in the protein itself. For example, consumers can have allergies or other inflammatory responses from the protein source.

The chickpea is a readily-available plant-based protein source lacking known consumer allergies. Chickpea protein has a long history a large degree of stability in food processing. Based on the dynamics of the chickpea itself, there is limited technology exists chickpea protein extraction. Existing techniques require heavily structured processes, including operations within very narrow ranges and complicated processing steps.

As such, there exists a need for a method and system to efficiently extract high quality protein from chickpeas.

BRIEF DESCRIPTION

A method and system provides for for de-oiling and extracting protein from chickpeas prior to generating chickpea protein concentrate. The method and system includes receiving a chickpea flour generated from the chickpeas, including having cortex material removed from the chickpeas and generating an ethanol mixture by mixing the chickpea flour with ethanol to remove at least a portion of the oil content from the chickpea flour. The method and system includes separating the ethanol mixture into a de-oiled chickpea flour and an ethanol recycling stream having organics from the chickpea flour absorbed therein. Therein, the method and system includes extracting a protein concentrate from the de-oiled flour.

A better understanding of the disclosed technology will be obtained from the following detailed description of the preferred embodiments taken in conjunction with the drawings and the attached claims.

DETAILED DESCRIPTION

Figure 1:
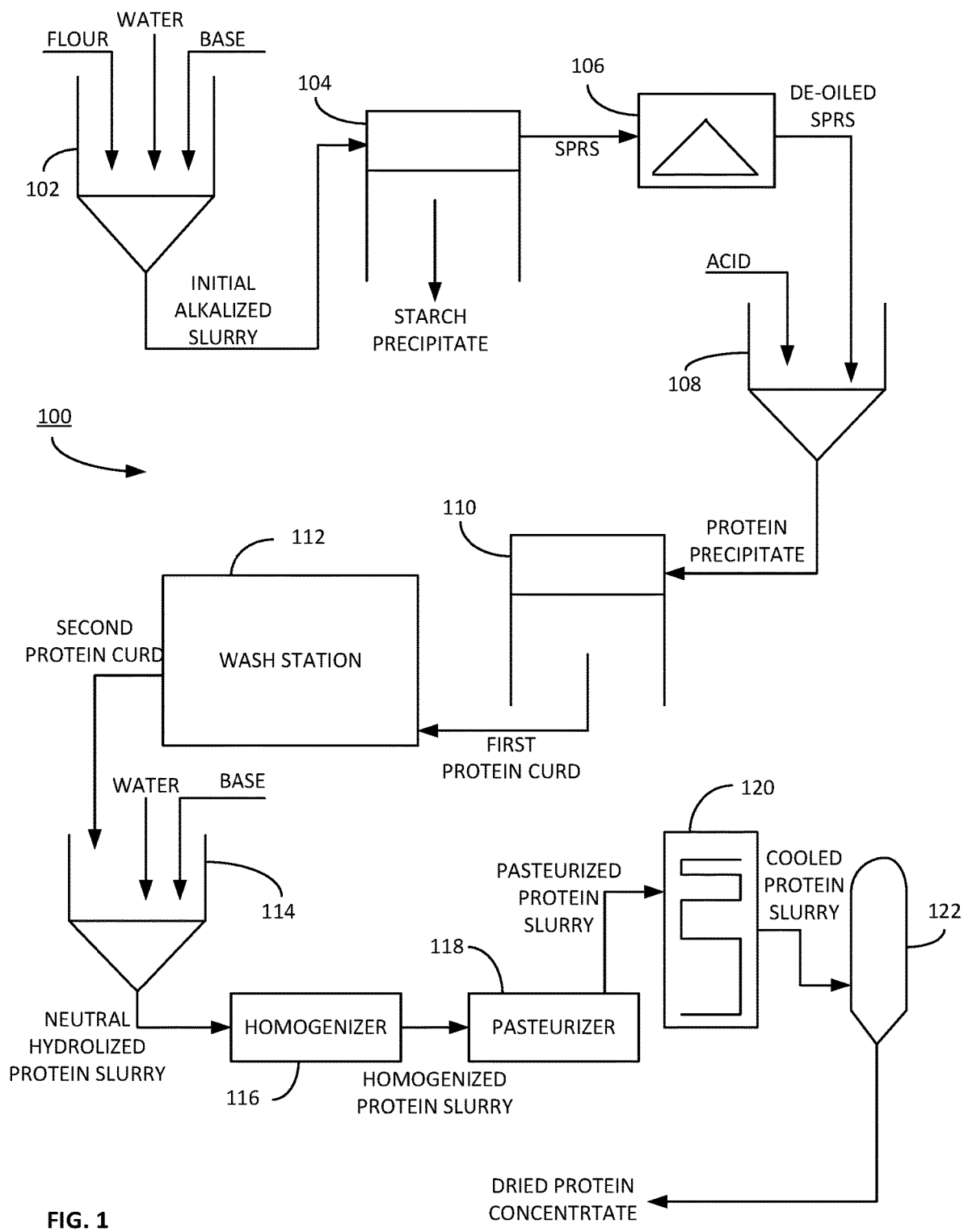
FIG. 1 illustrates a block diagram of one embodiment of a system for generating chickpea protein concentrate.

FIG. 1 illustrates a system 100 including a first mixer 102, a first separator 104, a second separator 106 and a second mixer 108. The system further includes a third separator 110, a wash station 112, a third mixer 114, a homogenizer 116, a pasteurizer 118, a vacuum evaporator 120 and a dryer 122.

FIG. 1 illustrates one embodiment of a process flow operation for generating the chickpea concentrate as described herein. In this embodiment, the process described herein makes the product of a chickpea concentrate.

The first mixer 102 receives flour, water and a base. In one embodiment, the flour is chickpea flour, but it is recognized that other suitable types of flour may be utilized. In this step, via the mixer, the flour is hydrated and there is a pH shift to solubilize the protein a solid-liquid extraction.

It is within the scope of the present invention that varying types of chickpea flour or the protein-based input ingredient(s) may be utilized, where the process described herein may be modified to account for such variations in the mixer 102 input. For example, the chick-pea flour may be a de-oiled flour, such that further processing operations described below for performing de-oiling operations may be omitted. For example, the flour may be pre-treated with a hexane extraction process, or other process to modify or adjust the physical composition of the flour, for example, as described in further detail in FIGS. 8-10 below.

In one embodiment, in the mixer 102, hydration of the flour includes water ratio ranges between 5-12:1 depending on equipment and desired purity of end product. While varying ranges may be utilized, this embodiment includes a low-end ratio is found to be 4:1, with a high-end ratio dependent upon capacity of drying operations noted below. In one embodiment, operational temperature range is between 4-60 C depending on embodiment of final product attribute, including generating a pH between 8-11. The mixer 102, in this embodiment, operates using low shear conditions. Similarly, this embodiment uses a reaction time between 30-60 min depending on holding conditions.

It is noted that the above ranges and conditions, as well as ranges, conditions and values noted within the present specification, are exemplary in nature of the various embodiments. The ranges and conditions are not limiting of the disclosed invention, wherein operations aspects outside the noted ranges may be utilized in the protein extraction process, as recognized by one skilled in the art.

Based on the mixing operations, the mixer outputs an initial alkalized slurry. The initial alkalized slurry is then transported to the first separator 104. As described in further detail below, the initial alkalized slurry may be transported using a low sheer pump, but it is recognized that any suitable pump may be utilized.

The first separator 104 separates the initial alkalized slurry into a starch precipitate and a solubilized protein rich steam. The separator 104, in one embodiment, is a decanter centrifuge. The starch precipitate is extracted and in one embodiment can be discarded. The solubilized protein rich stream is further processed to a second separator 106.

In one embodiment, solubilized protein rich stream may be transferred to the separator 106 using a low-sheer pump, but any other suitable pump may be utilized.

The solubilized protein rich stream is separated using, in one embodiment, with the separator 106 being a disk-stack centrifuge to remove cream fraction. The centrifuge output includes a concentrated oil cream and a de-oiled solubilized protein rich stream. The concentrated oil cream may be discarded or otherwise processed.

In one embodiment, separator 110, wash station 112 and mixer 114 may be omitted from the process flow, whereby the de-oiled protein rich stream can be passed through filters to extract functional proteins. It is recognized that other processing or extraction steps may be utilized aside from the examples noted herein. Wherein, the extracted proteins are then subject to further processing steps described herein.

Whereas, the present processing system therein transfers the de-oiled solubilized protein rich stream to a second mixer 108. An acid is additionally added into the second mixer 108.

Within the second mixer 108, the combination of de-oiled solubilized protein rich stream and the acid generates a protein precipitate. In this second mixer tank 108, acid is added to iso-electrically precipitate the protein. In one embodiment, temperature ranges between 20-75 C depending on the yield of protein extracted in the separation step using the first separator. The lower the temperature, the more native the protein will stay and the higher acid soluble loss. At high temps, higher yields and loss of some functionality will occur. One embodiment provides for pH level to be between 4.0-4.8 depending on temperature profile. Within the second mixer 108, in this embodiment, agitation level is low to promote flocculation. The acid type can be dependent on equipment and desired end functionality of protein.

The combination in the second mixer 108 generates the protein precipitate composed of a serum and an acid curd. The protein precipitate is provided to a third separator 110. In one embodiment, the protein precipitate is fed by a low-shear pump to the third separator 110, being a decanter centrifuge, to separate the serum from the acid curd. The serum protein is extracted, leaving a first protein curd transferred to the wash station 112.

Within the wash station 112, water is added to acid curd to rehydrate the mixture. The water is added via a water mixer to generate acid curd slurry. The wash station further includes wash separator that is, in one embodiment, fed by low-shear pump to the decanter centrifuge to separate the serum from the acid curd. The wash separator therein generates a second protein curd. Further embodiments of the wash station are described relative to FIGS. 2-3 below.

Once the process completes one or more washing operations, a third mixer 114 receives the protein curd output, as well as a base, water and an enzymatic cocktail (protease). In one embodiment, within the mixer 114, the protein curd is hydrated between 90 and 70% moisture. The protein curd is step-wise neutralized to a final pH of 6.5-7.5. Varying step-wise pH adjustments, temperature, and hold times for the mixer are specific to optimal enzymatic reactivity.

In one embodiment, for desired native proteins in the final product, the enzymes are not added.

The third mixer 114 output is a neutral hydrolyzed protein slurry. A high pressure homogenizer 116 receives the slurry such that high pressure homogenization provides for texture, particle size control, and homogenization of the slurry.

The high pressure homogenizer 116 generates an output of a homogenized protein slurry. This homogenized protein slurry is then pasteurized using the pasteurizer 118. In one embodiment, the pasteurizer performs pasteurization at a minimum temperature of 60 C, having a hold time that is dependent on pasteurizing temperature.

The pasteurization, via the pasteurizer 118, generates a pasteurized protein slurry. This slurry is fed into the vacuum evaporator 120. In one embodiment, the vacuum evaporator's pressure, temperature and flow rate are dependent on the pasteurization setup of the pasteurizer. For example, in one embodiment having a high temperature (e.g., 240 F), the vacuum evaporator may include a 2 second hold time with direct steam injection at a −0.5 bar pressure, with a 20 second hold time w/deltaT to 130 degrees at half bar.

Water is removed using the vacuum evaporator 120, producing an output of a cooled protein slurry. The vacuum evaporator 120 can operate in various embodiments based on the desired properties of the cooled protein slurry. For example, one embodiment may include higher order processing operations to remove aromatics attendant in the pasteurized protein slurry. In this example, if the final protein concentrate is usable for food supplements having taste parameters, the removal of the aromatics, also referred to as the volatiles, helps eliminate any subsequent aftertaste from the protein consumption. In other embodiments where the protein supplement may undergo further processing or combined in a manner where aromatics are not problematic, a less efficient operation of the vacuum evaporator 120.

In one embodiment the cooled protein slurry may include volatile elements based on the vacuum evaporation process not removing native aromatics. In another embodiment, the cooled protein may not include these volatile elements, as the elements are removed in the vacuum evaporation process.

The cooled protein slurry is fed into the dryer 122. The dryer 122 performs drying operations to generate a dried protein concentrate. Different embodiments of dryer types and feed temperatures are dependent on one or more factors, including: pasteurization operations; evaporator conditions; hydration level of neutralized protein slurry; and characteristics necessary to consumer application i.e bulk density, moisture level, particle size, and agglomeration.

Therein, the dryer 122 generates the dried protein concentrate originated from the flour, water and base originated in the first mixer 102.

Figure 7A:
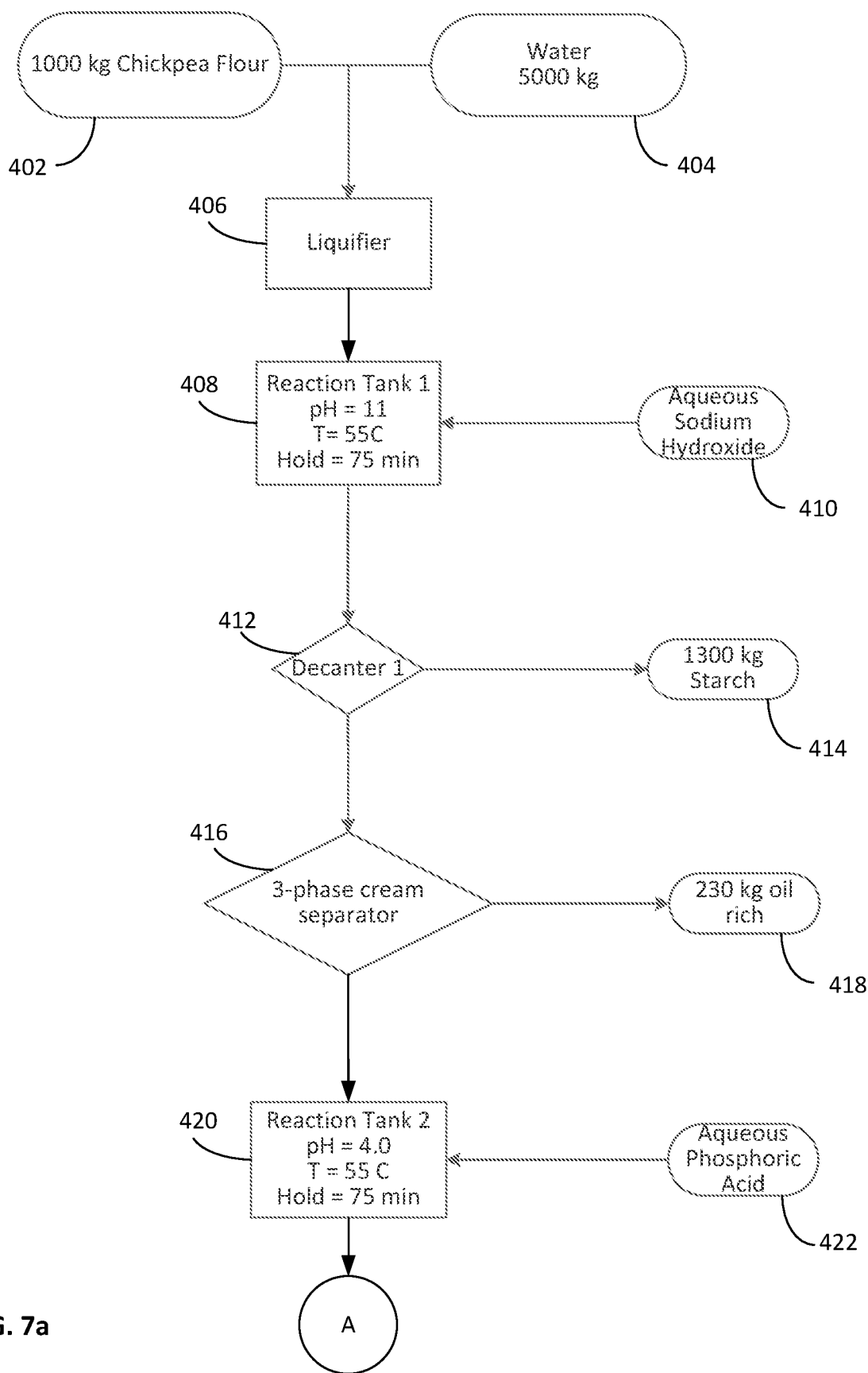
FIGS. 7a and 7b illustrate one exemplary embodiment of a system for generating chickpea protein concentrate.
Figure 7B:
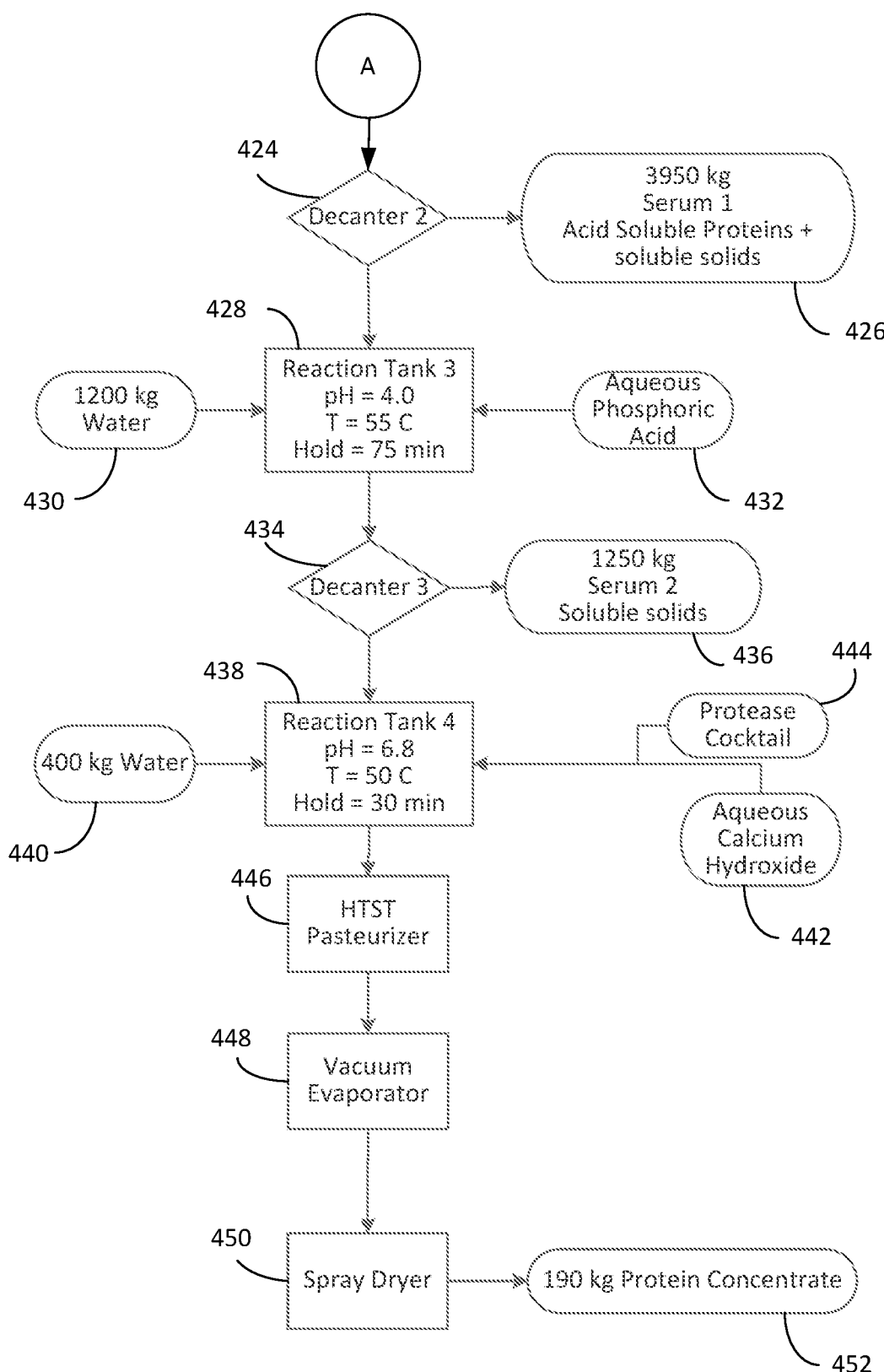

As described in further detail below, FIGS. 7a and 7b illustrate one specific exemplary embodiment of chickpea protein generation using noted operational values.

Figure 2:
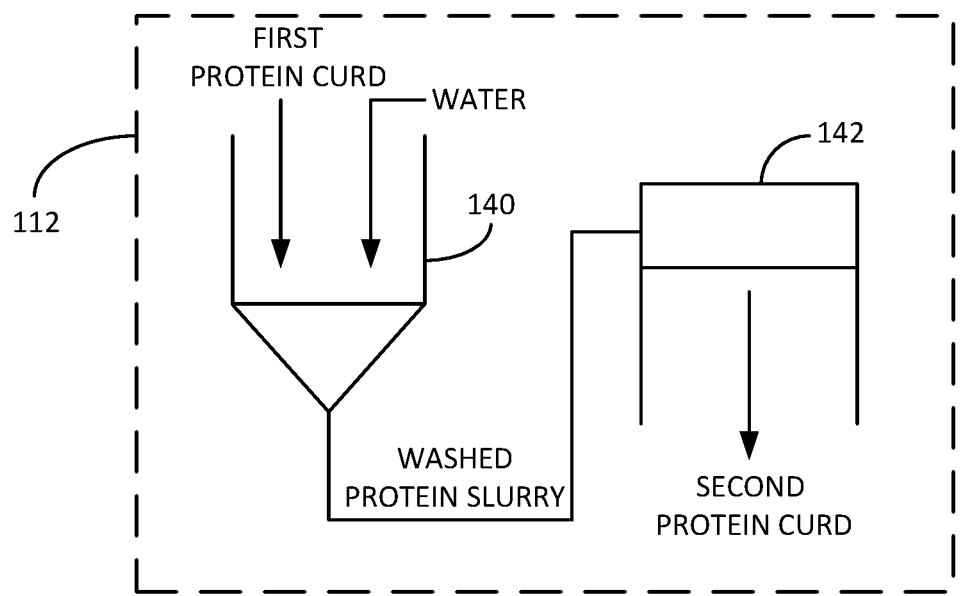
FIG. 2 illustrates one embodiment of a wash station of the system of FIG. 1.

FIG. 2 illustrates one embodiment of wash station 112 of FIG. 1. In this embodiment, the wash station 112 includes a wash mixer 140 and a wash separator 142. Within the wash station, water is added to acid curd to rehydrate the mixture. The water is added via the water mixer 142 to generate the acid curd slurry. In one embodiment, slurry moisture can range from 98-75% depending on equipment and purity of final product and pH can range between 4.0 and 4.8 depending on temperature profile. In one embodiment, the temperature can range between 20-75 C depending on previous precipitation condition, desired degree of denaturation, yield, and desired purity of the protein concentrate. In the water mixer 140, agitation is low to further promote flocculation.

The wash station 112 further includes the wash separator 142 that is, in one embodiment, fed by low-shear pump to the decanter centrifuge to separate the serum from the acid curd. The wash separator therein generates the second protein curd.

In different embodiments, the operations of the wash station may be iterated for further purity of the protein curd. For example, one technique may include a second wash station with the protein curd rehydrated and then fed by low-shear pump to another decanter centrifuge to further separate serum.

Figure 3:
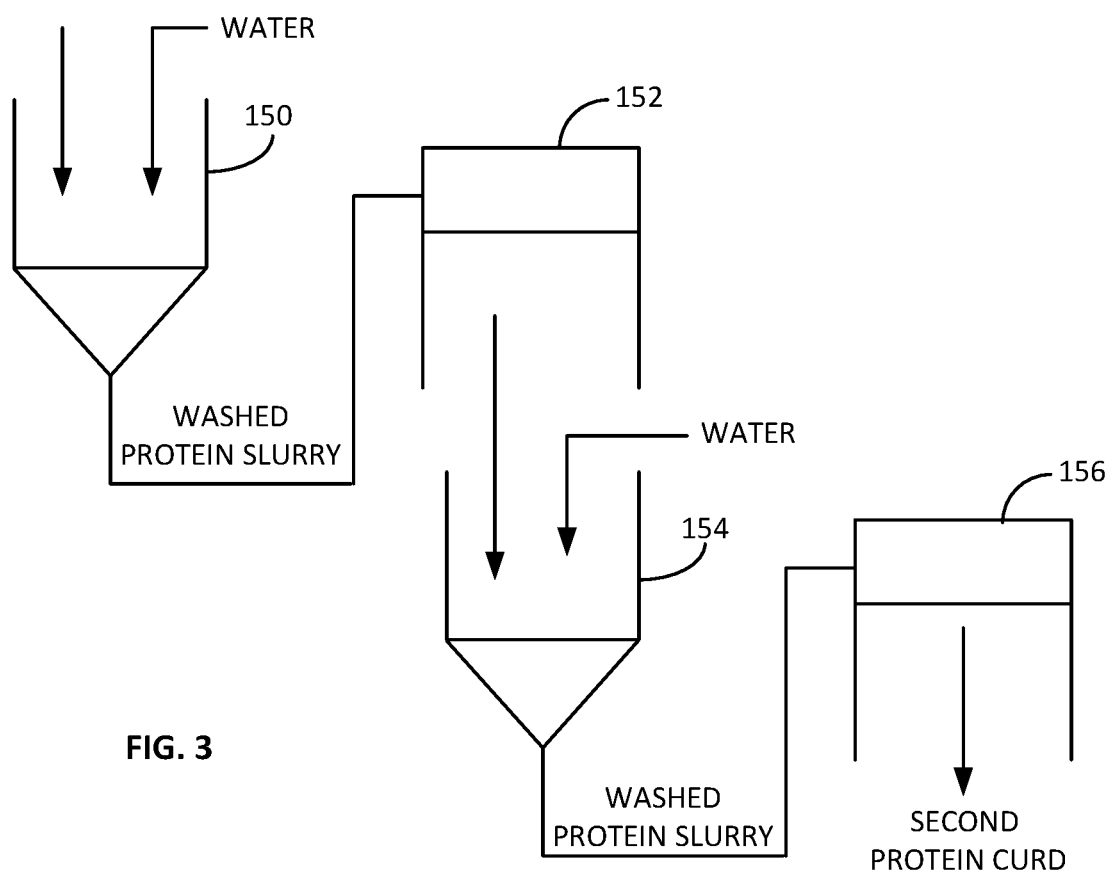
FIG. 3 illustrates another embodiment of a wash station of the system of FIG. 1

FIG. 3 illustrates one embodiment of a wash station have multiple wash mixers 150, 154 and multiple wash separators 152, 156. As illustrated, the output of the first wash separator 152 is fed directly into a second wash mixer 154. The second wash mixer combines the separator 152 output with water, generating the washed protein slurry. This slurry is fed into the second wash separator 156 to generate the second protein curd.

FIG. 2 illustrates the wash station 112 having a single mixing/separating stage, whereas FIG. 3 illustrates multiple mixing/separating stages. It is recognized that the wash station 112 may include any number of mixing and separating stages, providing higher degree of second protein slurry clarity consistent with operational guidelines, operational efficiency and desired quality of the protein concentrate extracted from the dryer 122 of FIG. 1.

Figure 4:
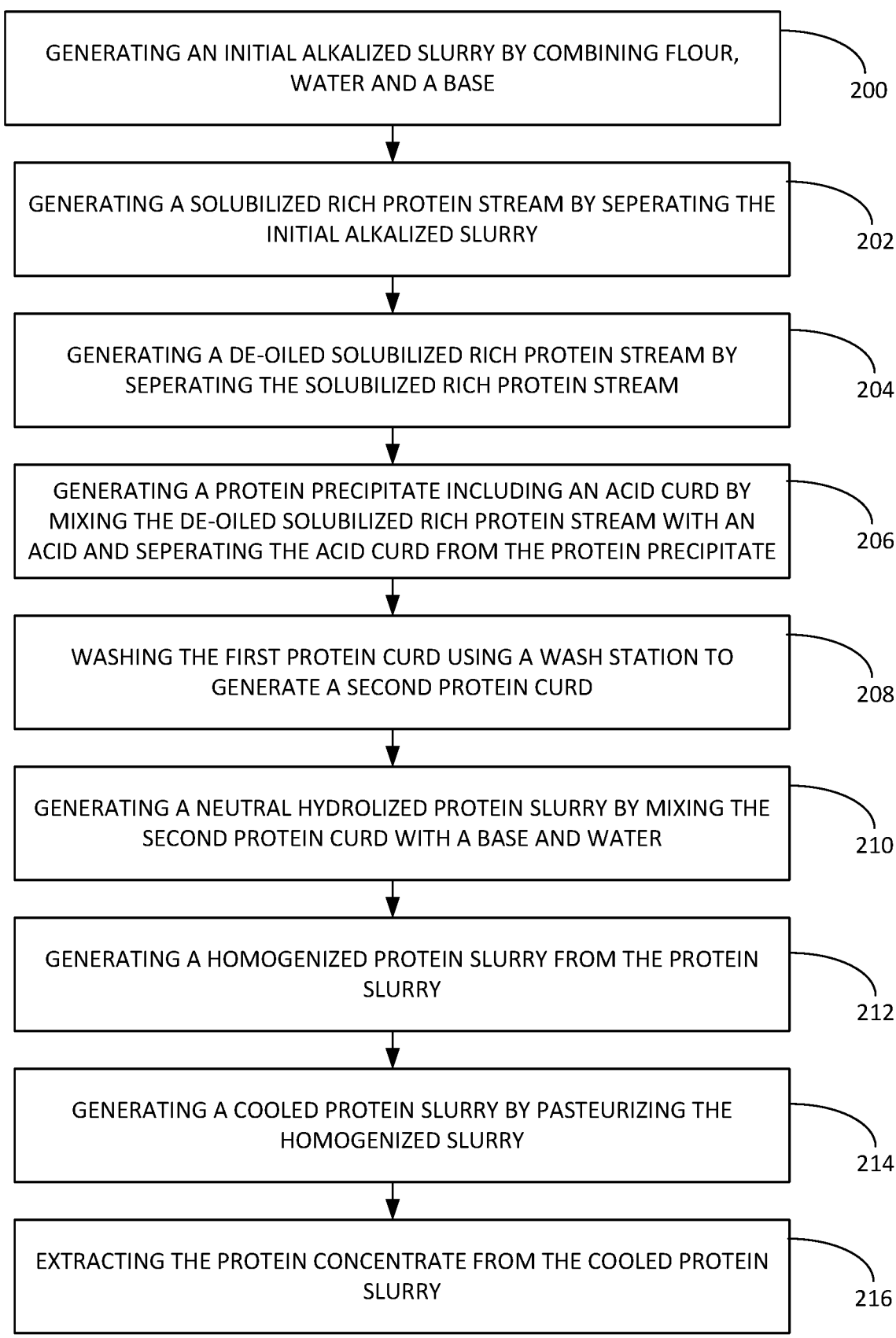
FIG. 4 illustrates a flowchart of one embodiment of a method for generating chickpea concentrate.

FIG. 4 illustrates one embodiment of a flowchart of steps of a method for generating a chickpea concentrate. The method described herein may be performed using the system 100 of FIG. 1, whereas it is recognized that the steps may be performed using any other suitable machine or apparatus for performing the described operation.

A first step, step 200, is generating an initial alkalized slurry by combining flour, water and base. As described above, the flour is a chickpea based flour.

In one embodiment, instead of chickpea flow feed stock, wet-milled while chickpeas can be used and fed directly to the wet process. In another embodiment, an air classified protein concentrate can be used. It is recognized that various other embodiments exist such that based on preceding processing conditions, a chickpea flour-type input in some manner or another, is fed into the system.

A next step, step 202, is generating a solubilized rich protein stream by separating the initial alkalized slurry. This step may be performed using a separator, wherein in one embodiment the step includes the removal of a starch precipitate from the slurry.

A next step, 204, is generating a de-oiled solubilized rich protein stream by separating the solubilized rich protein stream. This step may be performing using a separator, including generating a concentrated oil cream as well as the de-oiled solubilized rich protein stream.

A next step, step 206, generating a protein precipitate including an acid curd by mixing the de-oiled solubilized rich protein stream with an acid and separating the acid curd from the protein precipitate. This step may be performed using the second mixer 108 as described above.

A next step, step 208, is washing the first protein curd using a wash station to generate a second protein curd. As described in further detail below, this step may include iterative washing operations, generating the second protein curd.

A next step, step 210, is generating a neutral hydrolyzed protein slurry by mixing the second protein curd with a base and water. This step may be performed using the third mixer of FIG. 1 above.

A next step, step 212, is generating a homogenized protein slurry from the protein slurry. The homogenization may be performed using a high pressure homogenizer as described above.

Therefrom, step 214, is generating a cooled protein slurry by pasteurizing the homogenized slurry. The protein slurry may be cooled using a vacuum evaporator, similar to the evaporator 120 of FIG. 1 with operations conditions as described above.

In various embodiments, the cooling of the protein slurry can be performed to varying degrees generating varying quality levels of cooled protein slurry. Using a higher order of evaporating, undesired aromatics may be extracted from the protein slurry.

Step 216 is extracting the protein concentrate from the cooled protein slurry. This step may be performed using a dryer performing drying operations, extracting water as the byproduct of the drying process. Therein, in this embodiment, the method provides the extracting of protein concentrate from chickpea flour.

Figure 5:
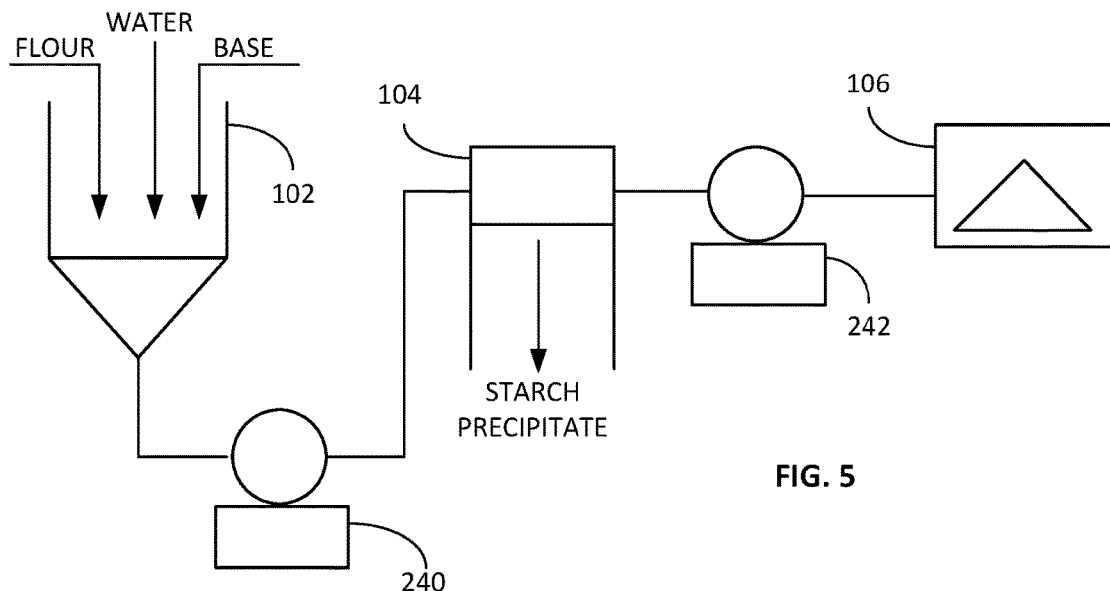
FIG. 5 illustrates another embodiment of a portion of the system for generating chickpea protein concentrate of FIG. 1.

FIG. 5 illustrates one embodiment of a portion of the system of FIG. 1. The illustrated embodiment of FIG. 5 includes the first mixer 102, the first separator 104 and the second separator 106. Whereas, in this embodiment, the outputs from the first mixer 102 is transferred to the first separator using a low sheer pump 240. Similarly, the output of the first separator 104 is transferred to the second separator 106 using a low sheer pump 242. In one embodiment, a positive displacement pump can be used to achieve low shear conditions. An example of this pump is the Waukesha Universal II Pump, Model 130-U2 available from Waukesha Cherry-Burrell in Delavan Wis.

Figure 6:
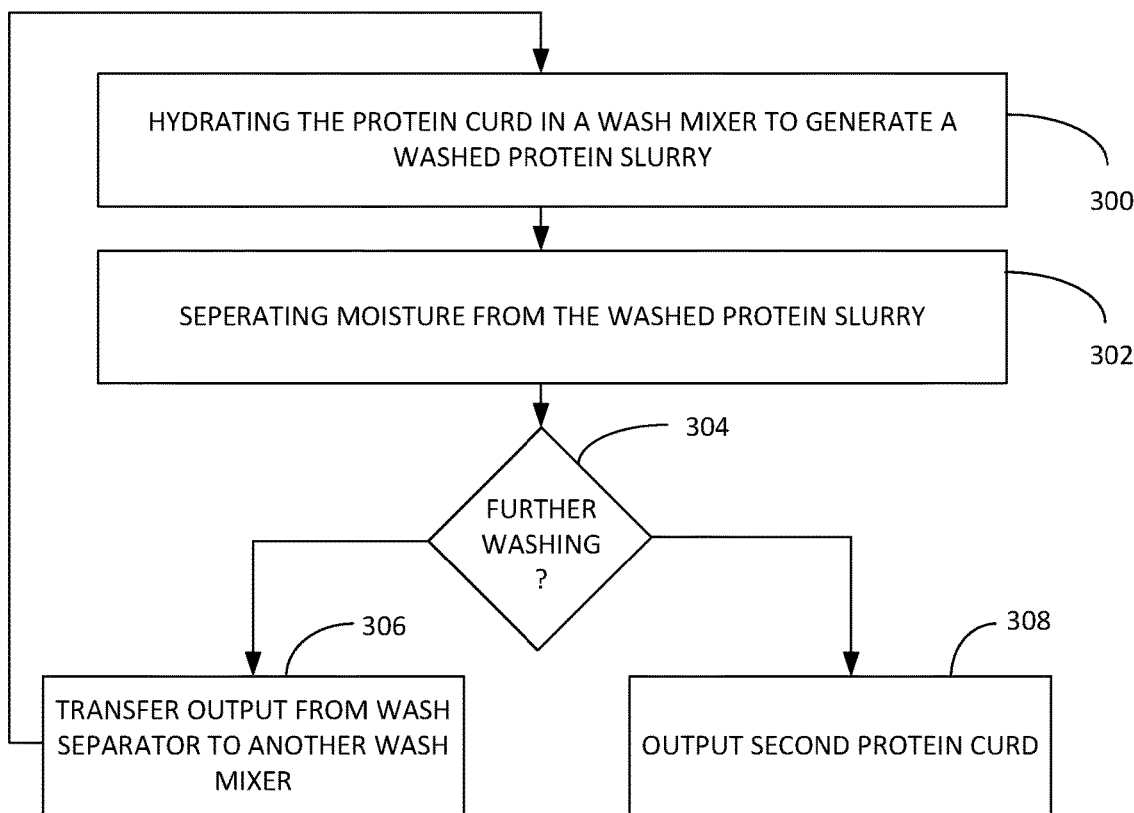
FIG. 6 illustrates steps of embodiment of the method for generating chickpea protein concentrate.

FIG. 6 illustrates a flowchart of one embodiment of further operations of the wash step 208 of FIG. 4. The steps of FIG. 6 may be performed using the elements of FIG. 2 or FIG. 3 described above.

A first step, step 300, is hydrating the protein curd in a wash mixer to generate a washed protein slurry. A next step, step 302, is separating the moisture from the washed protein slurry. In the methodology of FIG. 6, a determination is made if there are further washing iterations, step 304.

In the event further washings are requested or required, step 306 is transferring the output of the wash mixer from the wash separator into another wash mixer. Thereupon, the method re-iterates to step 300. In the event the determination of step 304 is that no further washing is requested or required, the method reverts to step 308, outputting the second protein curd. Therefore, the methodology allows for the iterative washing of the protein curd, if desired.

FIGS. 7a and 7b illustrate a processing flowchart of one exemplary embodiment of a chickpea protein extraction process. While noted with exemplary values, the embodiment of FIGS. 7a and 7b, including the exemplary values, are not limiting in nature as varying processing values may be readily utilized, as recognized by one skilled in the art.

The process begins in FIG. 7a, wherein 1000 kg Chickpea flour 402 is liquefied with 5000 kg water 404 using a liquefier 406. The combined slurry enters a first reaction tank 408 in which the pH is adjusted to 11 using aqueous sodium hydroxide 410, temperature at 55 C and held under low shear conditions for approximately 75 minutes. Using the first decanter 412, approximately 1300 kg of wet starch 414 is then extracted and the protein rich liquid is passed through a 3-phase cream separator 416. This cream separator extracts approximately 230 kg of concentrated oil 418.

The de-oiled protein stream from the 3-phase cream separator 416 then passes into a second reaction tank 420, in which the pH is adjusted to 4.0 using aqueous phosphoric acid 422, temperature at 55 C, and held approximately 75 minutes. From the second decanter 420, 3950 kg aqueous sugars and acid soluble proteins 426 are removed to the light phase. From the second decanter 420, the protein curd is then provided to a third reaction tank 420, rehydrated to 10% dry solids with 1200 kg water 430 at 55 C. If necessary, the pH is adjusted back to 4.0 using aqueous phosphoric acid 432 and held for approximately 75 minutes.

The rehydrated protein rich slurry is then passed through a third decanter 434, removing approximately 1250 kg of serum 2 consisting of primarily aqueous sugars 436. A fourth reaction tank 438 receives the second acid curd from the third decanter 434, combines with 400 kg of water at 50 C 440, to achieve a 15% dry solid mixture. The pH is adjusted to approximately 6.8 using calcium hydroxide 442 and then a protease cocktail 444 is added to cleave the proteins for end application.

In this embodiment, the enzymatic reaction is allowed to take place for approximately 30 min under low shear conditions and fed to a High Temperature/Short Time pasteurizer 446 to kill any microbial and terminate the enzymatic reaction.

The slurry is then fed to a vacuum evaporator 448 to increase the solids level. The output of the evaporator 448 is then spray dried using spray dryer 450. Wherein, in this embodiment, the process obtains 190 kg of a hydrolyzed protein concentrate 452 at minimum 80% protein.

Figure 8:
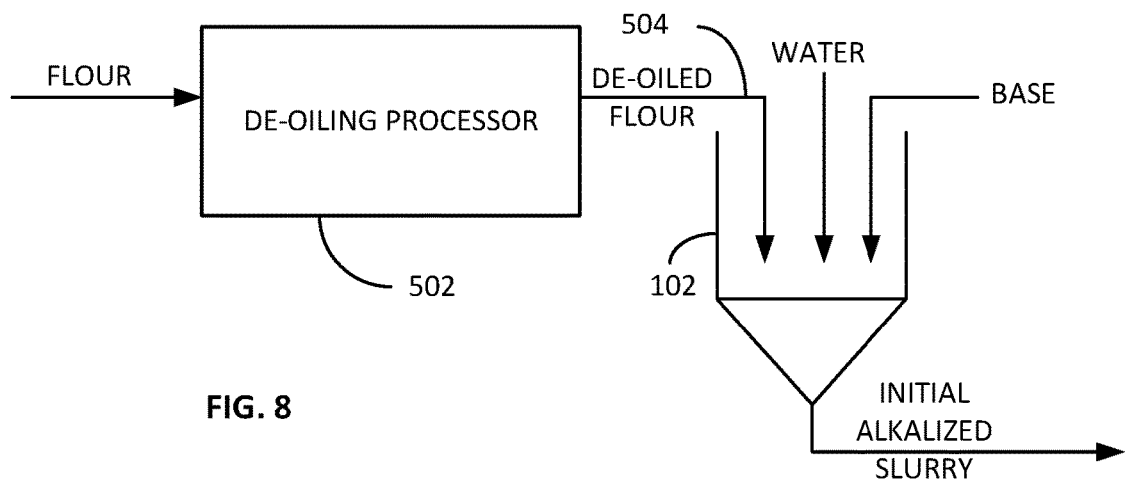
FIG. 8 illustrates a block diagram of a de-oiling processor prior to protein extraction.

FIG. 8 illustrates one embodiment of another technique for generating plant-based protein extraction by de-oiling the material prior to the protein extraction process. The elements of FIG. 8 provide for pre-processing of the flour, as illustrated in FIG. 1, but include the removal of oil, sugars and other organics within the flour.

Figure 9:
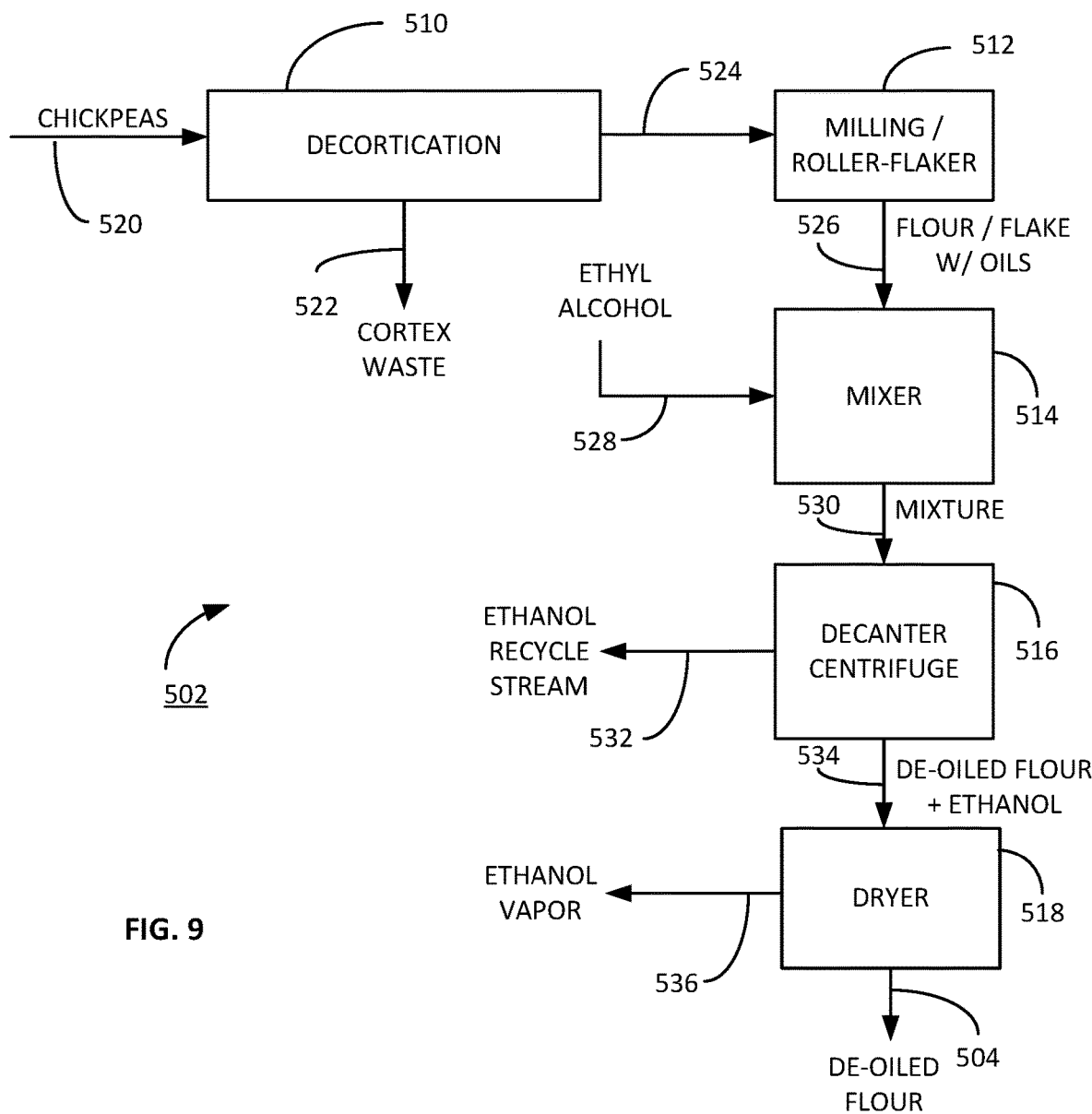
FIG. 9 illustrates a block diagram of one embodiment of a de-oiling processor.

The embodiment of FIG. 8 includes a de-oiling processor 502, as described in further detail in FIG. 9. The de-oiling processor receives the food element from which the protein is extracted. In the exemplary embodiments of FIGS. 8 and 9, the food source is chickpeas, but as noted herein, any other suitable type of food source may be utilized. Via the de-oiling process, the processor 502 generates de-oiled flour 504.

Similar to the process of FIG. 1, the de-oiled flour is therein provided to the mixer 102, along with water and a base to generate the initial alkalized slurry. Where the de-oiling processor 502 includes a flour mill, the de-oiled flour 504 may be the same flour input as noted in FIG. 1. If the processor 502 uses a roller mill/flaker, additional milling may be required to convert the flakes to a powder format usable as a direct input to the mixer 102.

With respect to the processing operation described above in FIG. 1, the inclusion of the de-oiling processor thereby modifies the FIG. 1 processes flow. Whereas in FIG. 1, the solubilized protein rich stream is fed to the separator 106 to remove a cream fractionation, this step is therefore extraneous. Rather, where the separator 106 de-oiled the solubilized protein rich stream, this stream is in this embodiment without oil. Thus, the solubilized protein rich stream is fed directly to the mixer 108 as illustrated in FIG. 1.

With respect to the above-noted operational aspects of the system of FIG. 1, these operational ratios and flow rates are based on a function of water solubility. The de-oiling process of the processor 502 therefore does not material change the operational ratios noted above and therefore in one embodiment the same operational ratios for the embodiment of FIG. 8 may be utilized in FIG. 1.

FIG. 9 illustrates one embodiment of the de-oiling processor 502 of FIG. 8. In the exemplary embodiment, the de-oiling is performed using a decortication device 510, a milling or roller-flaker 512, a mixer 514, decanter centrifuge 516 and a dryer 518.

The decortication device 510, mixer 514, decanter centrifuge 516 and dryer 518 may be any suitable device operative to perform the processing operations described herein, as recognized by one skilled in the art. The milling/roller-flaker 512 represents one of several varying embodiments operative within the present system. The device 512 may be a roller mill/flaker that is operative to process the decorticated chickpeas and generate flakes. The device 512 may, in another embodiment, be a flour mill operative to mill flour instead of flakes.

The decortication device 510 receives the chickpeas, which can be provided raw. The device 510 operates to remove the cortexes from the chickpea, removing the outer hull and exposing the protein-rich insides. The device 510 generates cortex waste 522, which can be discarded. The device 510 further outputs the chickpeas having the shells or cortexes removed to the milling/roller-flaker device 512.

The milling/roller-flaker device 512 operates to mill the chickpeas into a milled or flour feedstock. In one embodiment, instead of being milled to a particular powder, the device 512 may flake the chickpeas to a designated flake size, such as in one exemplary embodiment having flakes in the range of 0.25 mm to 0.4 mm, but such range is not limiting in nature. Whether the device 512 is a flaker or a miller, the output 526 still includes its oil. As noted herein, the flake ranges of 0.25 mm to 0.4 mm are exemplary ranges, but not express limiting ranges. It is recognized that smaller flake size may be utilized up until the flakes have a powder consistency. It is further recognized that larger flakes may be utilized where larger flakes may require further processing for efficient de-oiling.

As part of the de-oiling process, the mixer 514 therein mixes the flour 526 with ethyl alcohol 528, more commonly referred to as ethanol. The mixture of the ethanol with the flour provides for removal of the oil from the flour in accordance with known oil-extraction techniques. The mixer 514 may be an immersion or ethanol-wetting tank, which may include a mixing element to saturate the flour with ethanol. It is recognized that one embodiment uses pure ethanol herein, but other variations of ethanol may be utilized including ethanol mixed with other liquids, including have a water concentration or other mixture recognized by one skilled in the art, including for example ethanol recovered from a recycling loop as described below in FIG. 11.

The mixer 514 output is a mixture 530 of the flour and ethanol. The decanter centrifuge 516 receives the mixture 530 and therein extracts ethyl alcohol recycling stream 532, consistent of ethyl alcohol with oils, sugar and other organics absorbed therein. The extractor 516 additionally generates the de-oiled flour 534 with remaining ethanol. In this embodiment, the flour mixture 534 is a wet mixture, which is then provided to the dryer 518.

The desolventizing dryer 518 therein dries the flour mixture to remove final amounts of ethanol. A dryer output includes ethanol vapor 536, which can be collected and condensed for recirculation back to the mixer 528. The dryer also outputs the de-oiled flour 504, which is then made available to the mixer 102, as noted in FIG. 8 and FIG. 1.

Figure 10:
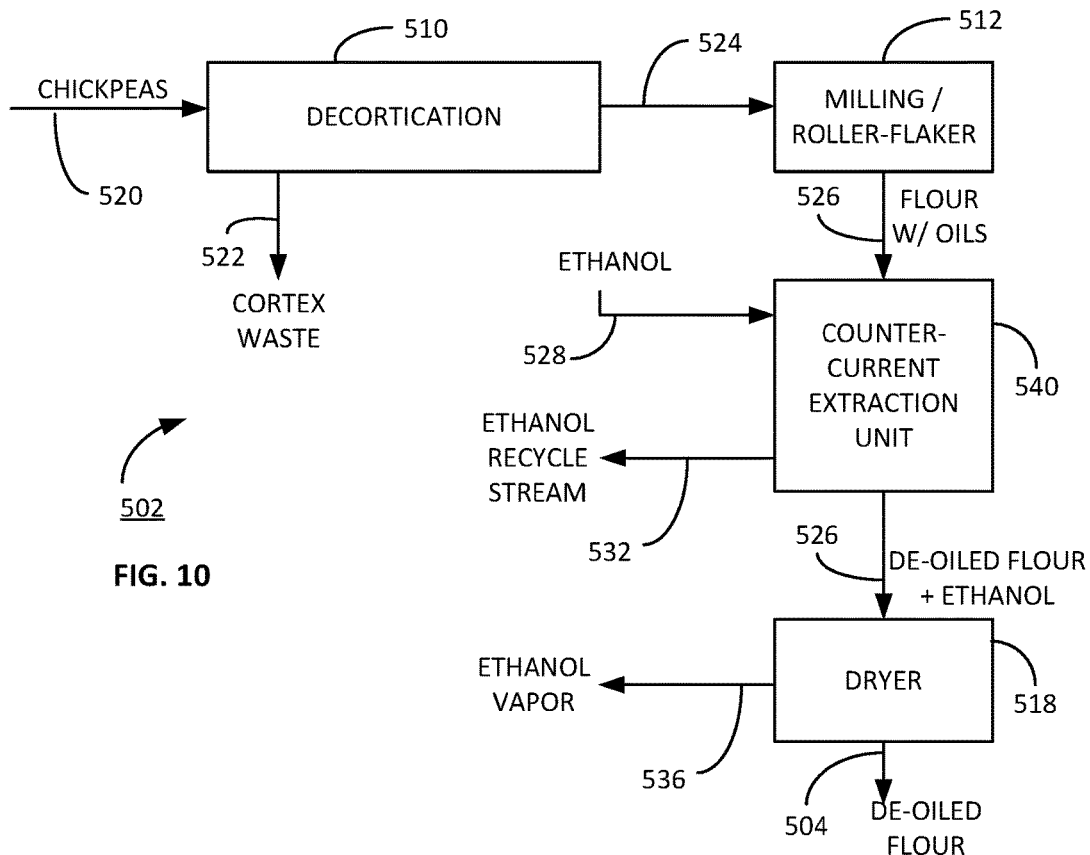
FIG. 10 illustrates a block diagram of another embodiment of a de-oiling processor.

FIG. 10 illustrates another embodiment of the de-oiling processor 502. This embodiment, includes the decortication device 510, milling/roller-flaker 512 and dryer 518, but instead uses a counter-current extraction unit 540. By way of example, the unit 540 may be a Crown Countercurrent solvent extraction unit, manufactured by Crown Ironworks, Roseville, Minn.

Similar to the operations of FIG. 9, the decortication device 510 generates waste 522, as well as the input to the milling/roller-flaker 512. Depending on whether the device 512 is a roller miller/flaker or a flour mill, the output is either flakes or flour, having oil contained therein.

In this embodiment, the counter-current extraction unit 540 receives the flake/flour plus oil mixture 526. Performing operations consistent with countercurrent extraction, the device 540 therein generates two outputs. Ethanol recycling stream 532 is the first output stream and de-oiled flour with ethanol 534 is the second stream. Therein the dryer 518 generates the ethanol vapor and de-oiled flour 504.

It is recognized that for embodiment of FIGS. 9 and 10, where the device 512 is a roller mill/flaker, the described flour includes flakes. These flakes are then further processed by a flour mill prior to insertion into the mixer 102 of FIGS. 1 and 8. Moreover, for ease of terminology, where described in FIGS. 9 and 10, describing flour after device 512, such description includes flakes relating to embodiments employing the flaker instead of the flour mill.

The dryer 518 of FIG. 9 and FIG. 10 may additionally include varying embodiments not expressly illustrated. For example, one dryer 518 type may be an air/nitrogen air-flow dryer that generates the de-oiled flour. Another embodiment of the dryer 518 may be a vacuum dryer. Another embodiment may utilize a desolventizing toaster in operation with the vacuum dryer.

The variances of elements noted in FIGS. 9 and 10 provide for a large number of varying embodiments. It is within the scope of this process for utilizing any variation of the devices 512, 514, 516, 518 and 540. For example, one embodiment may include a roller miller/flaker 512 with a mixer 514, decanter centrifuge 516 and a vacuum dryer 518. For example, another embodiment may include a flour mill 512, a countercurrent extraction unit 540 and an air-nitrogen air-flow dryer 518. Such examples are illustrative in nature only and not limiting.

Therein, the process of decortication with milling and/or roller-flaking of the feedstock and ethanol-based extraction results in efficient processing of the protein source while preserving the food grade nature of all fractions. The above embodiment is described with chickpeas, but is also operable on other members of legume family, as well as any suitable feedstock having an oil content.

Figure 11:
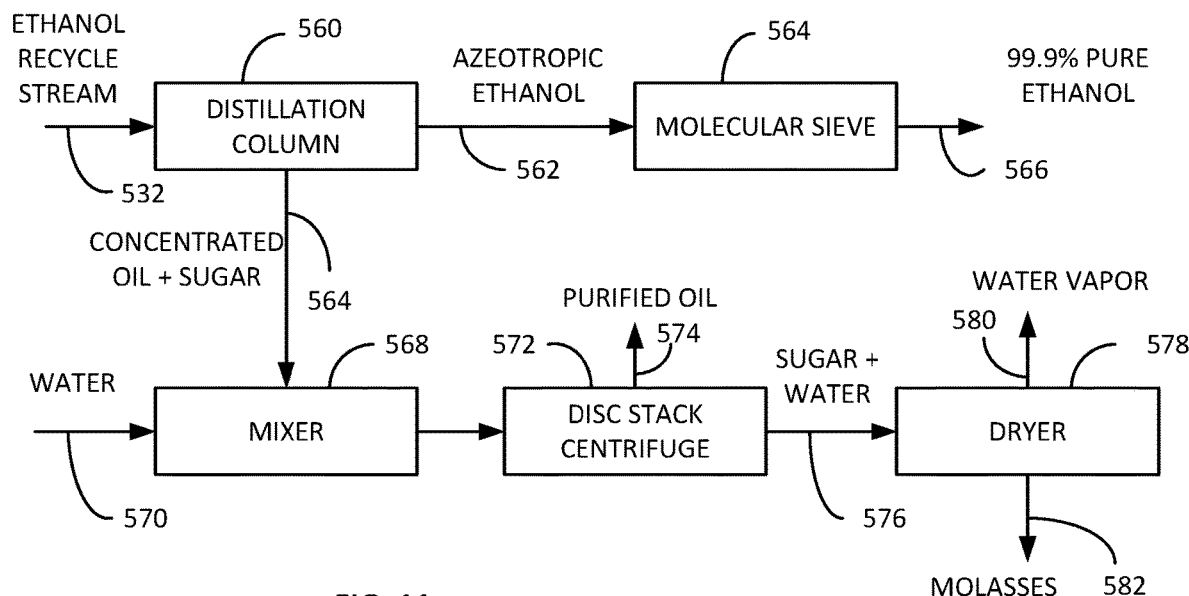
FIG. 11 illustrates a block diagram of one embodiment of an ethanol recycling loop for use in conjunction with the de-oiling processor.

FIG. 11 illustrates one embodiment of an ethanol recycling loop usable with the processor 502 of FIGS. 8-10. The recycling loop receives the ethanol recycling stream 532, consisting of oil extracted from the material, ethanol and sugar. A distillation column 560 separates the input 532 into azeotropic ethanol 562 and concentrated oil, sugar and other organics 564. In one embodiment, molecular sieves may be used to extract water from the ethanol 566. Such ethanol can then be recycled back to the mixer 528 of FIG. 9 and/or the countercurrent extraction unit 540 of FIG. 10.

In FIG. 11, a mixer 568 receives both the concentrated oil and sugar 564 as well as water 570. A disc stack centrifuge 572 receives the mixture and output purified oil 574 and sugar and water mixture 576. A dryer 578 dries the input 578 to produce water vapor 580 and molasses 582. In one embodiment, an optional enzymatic process may be performed prior to the dryer 578. Regardless, in the system of FIG. 11, the ethanol 566 can be recycled and re-used in the de-oiling process. It is recognized by one skilled in the art that further variations of the recycling operations may be utilized.

Figure 12:
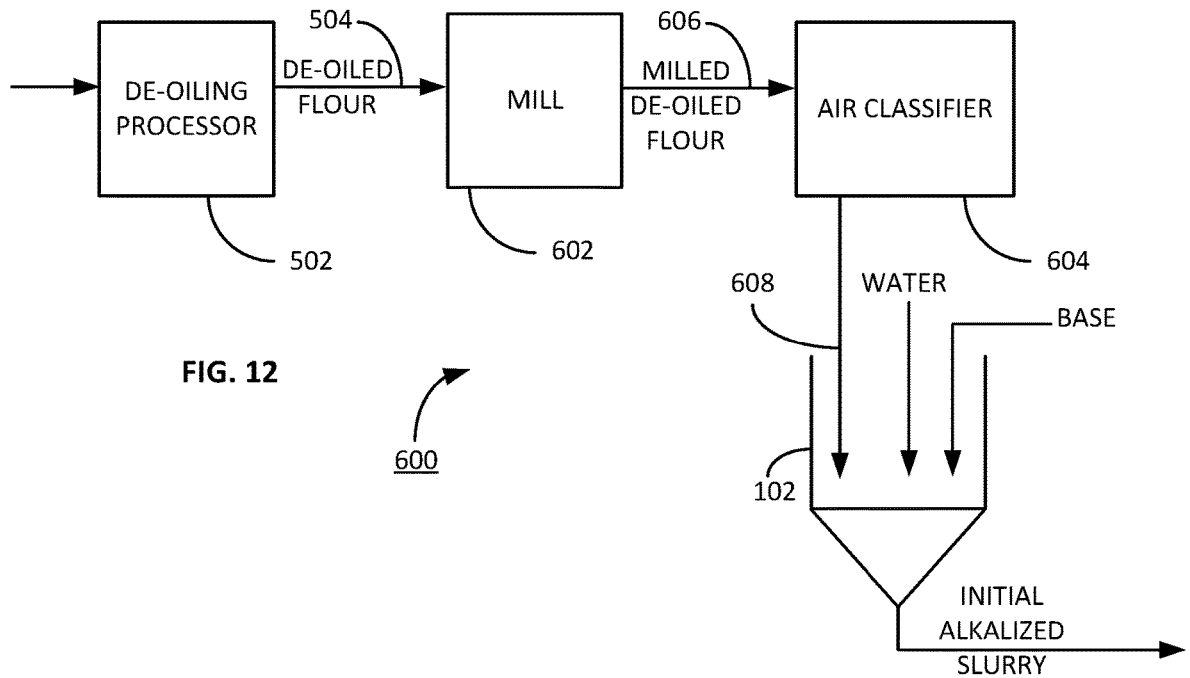
FIG. 12 illustrates a block diagram of one embodiment of a dry fractionation system.

Further processing of the protein source provides for the improvement of yield and purity of the protein concentrates. As described herein, the exemplary protein source is chickpea, but any other plant-based protein source may be utilized. The present processing is not expressly limited to chickpeas, but using chickpeas as one exemplary embodiment. FIG. 12 illustrates one embodiment of a system for improving protein concentrate yields and purity, complimentary to the systems and methods described above. The system 600 of FIG. 12 may operate prior to the mixer 102 as noted above in FIG. 1. The system 600 of FIG. 12 may additionally receive de-oiled protein flour, such as flour 502 generated from the de-oiled processor 502 described above.

The system 600 includes a mill 602 and an air classifier system 604. The mill 600 may be any suitable milling device, such as by way of example of a jet mill, hammer, pin or any other suitable device recognized by one skilled in the art. The air classifier 604, as described in further detail below, may be one or more air classification systems operative to process and classify the concentrate output within a defined classification range.

In the operation of the system 600, the mill 602 receives the de-oiled flour 504 and generates milled de-oiled flour 606. In an exemplary embodiment, the particle size can range between 5 and 100 micron, but it is recognized that any other suitable particle size range is within the scope herein. It is further noted that while the system 600 illustrates the mill 602 receiving the de-oiled flour 504, the mill may additionally process flour not having been subjected to the de-oiling process of FIGS. 9-11, such that generated milling output 606 would then be milled flour instead of milled de-oiled flour 606.

The air classifier 604 therein performs air classification operations, such as described in FIG. 13 below. The classification process therein generates a protein concentrate 608, which with respect to the above-described protein extraction process, may then be received by the mixer 102, along with water and base to produce the initial alkalized slurry. It is recognized that in the embodiment where the protein concentrate 608 is from the milled de-oiled flour, the subsequent processing of FIG. 1 therein excludes creamer 106 similar to the de-oiled embodiment described above. It is further noted that in some protein sources having a high oil content, the oil content can disrupt the efficiency of the milling process by causing the mill to operate at a slower pace to avoid getting gummed up, such that by de-oiling the flour to lower its oil content, and remove attendant moisture, the milling operations can operate more efficiently, as well as eliminate oil removal processing operation(s) at later protein extraction stage(s).

For clarity of terminology, as described herein, the air classification technique generates varying outputs of protein concentrates. By comparison, the protein extraction process, such as described herein including FIG. 1 for example, generate protein concentrate product. The protein concentrates from the air classification systems undergo further processing to generate the protein concentrate product. Therefore, in reference to air classifications, the protein concentrates are the air classification output, separate from the protein concentrate product. Whereby, it is noted that the protein concentrate product, as generated herein, may be sold or otherwise distributed for consumption or processed for manufacturing of food products. Similarly, the protein concentrates from the air classifier(s) may additionally be sold or otherwise distributed for consumption or processed for manufacturing of food products.

Figure 13:
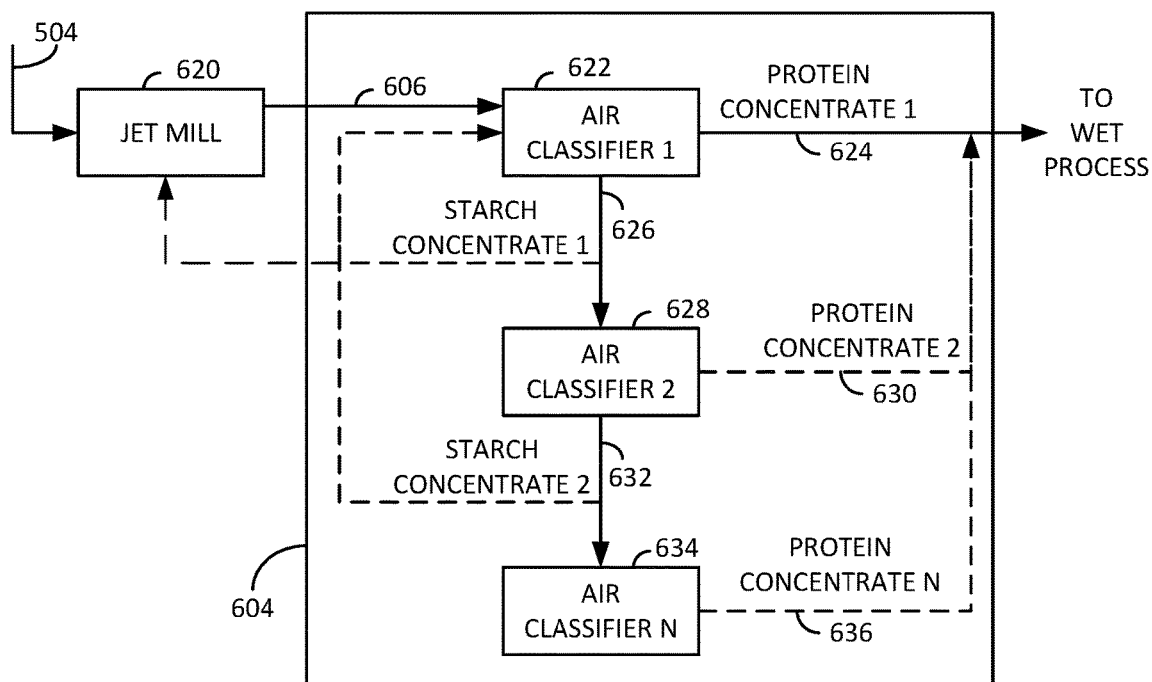
FIG. 13 illustrates multiple embodiments of the dry fractionation system.

FIG. 13 illustrates multiple embodiments of the air classifier 604, as well as the exemplary jet mill 620, as one embodiment of the mill 602 of FIG. 12. The mill 620 receives the flour 504, generating milled flour 606. A first air classifier 622 receives the milled flour 606 to generate a first protein concentrate 624. By way of example, the classifier 622 may be a Netzch Model CFS30 manufactured by Netzch Inc. of Exton, Pa. The classifier 622 may have a designated percentage target split of to fines based on desired protein concentrate. In this example, the light fraction in the first air classifier 622 may be between 15% and 50% split. The air classification generates the protein concentrate 624 and a starch concentrate 626, using known air classification techniques.

In one embodiment, the starch concentrate 626 is then re-fed back to the air classifier 622 for further refinement and processing.

In one embodiment, the generation of the protein concentrate 624 may therein be sufficient for the protein extraction process described above. Whereas, further refining the protein concentrate 624 produces a higher purity level of the protein concentrate used for the wet process. For example, if the protein concentrate 624 is fed to another air classifier, this can improve the purity level by extracting further starch concentrate, leaving a higher purity level in the protein concentrate.

In further embodiments, additional processing of the starch concentrate 626 and further air classifiers may produce higher yields of protein concentrate. In one embodiment, the air classifier 604 includes a second air classifier 628, which receives an input of the starch concentrate 626. The second air classifier 628 therein performs further air classification operations to generate a second protein concentrate 630, which extracts further protein from the starch concentrate 626, improving the yield of protein concentrate from the flour 606. In one embodiment, the concentrate 630 may then be added into the protein extraction process along with the first protein concentrate 624.

The second air classifier 628 additionally generates a second starch concentrate 632. This second starch concentrate 632 may be feed back to the first air classifier 622 for further refinement. In an additional embodiment, the starch concentrate from an air classifier may be fed back to the mill 620. For example, starch concentrate 626 from the first air classifier 622 may include particles whereby the protein was not sufficiently removed from the starch granules in a first pass. Thereby, in this embodiment, reprocessing the starch concentrate 626 back through the mill 620 can improve protein capture yields.

In a further embodiment, any suitable number of air classifiers may be used, illustrated here as air classifier N 634, where N may be any suitable integer. For example, to maximize yield, a process may include four or five air classifiers operating to generate the protein concentrate, such as concentrate 636. It is recognized that additional air classifiers operate on the starch concentrate produced by the previous air classifier, so it there is a degree of diminishing returns for producible yield using multiple air classifiers on starch concentrates. Similarly, while not expressly illustrated in FIG. 13, additional air classifiers may be used on the protein concentrate 624, 630 and/or 636 to improve the purity of the protein concentrate.

By way of example, one embodiment may include the first air classifier 622 generating a concentration split of 15-50% by feed mass to the starch concentrate 626 and the protein concentrate 624 can be greater than 45%. The second air classifier 628 may additionally split 15-50% by feed mass to the starch concentrate 632 and protein concentrate 630 can be greater than 55% purity. A third air classifier 634 may generate the same split of 15-50% to the starch concentrate and protein purity greater than 65%. The further air classification of the starch concentrate improves yield by separating additional protein concentrate.

Similarly, in one embodiment, a range for the split by weight between the protein concentrate 624 and the starch concentrate 626 may be approximately 35% by weight of the protein rich fraction, the protein concentrate 624 and approximately 65% by weight of the starch concentrate 626, plus or minus 15% each. Therein, in this embodiment, the concentration of the protein concentrate 624 may be 65% protein on a dry basis with a range of +/−15%. In this embodiment, the protein concentration of the starch concentrate may be 10%+/−5%. Therefore, this air classification process may be repeated one or more times to further extract additional protein concentrate, to improve yield and/or purity. For example, the protein concentrate 624 can be further air classified to remove particles finer and lighter than the protein at a split of approximately 3-10% to fine fraction. Upon further air classification, the starch concentrate may be ash, such as fibers, inorganic materials or other matters, or other insoluble materials, leaving the higher purity protein concentrate.

Figure 14:
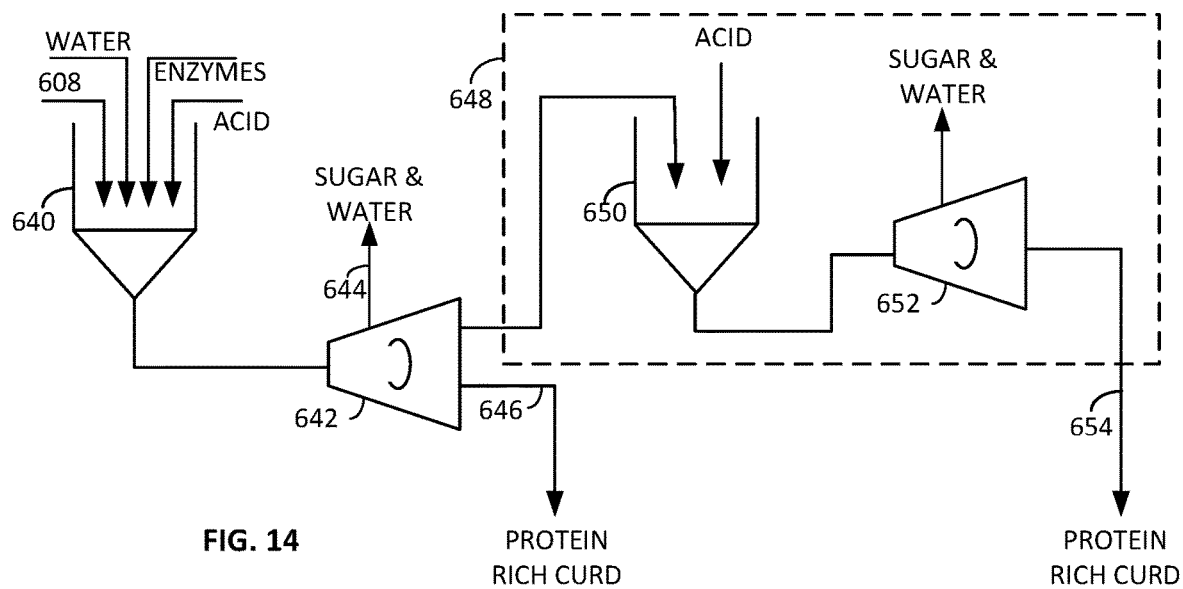
FIG. 14 illustrates multiple embodiments of protein extraction using dry fractionation.

FIG. 14 illustrates several embodiments for processing the protein concentrate 608. As noted above, the concentrate 608 may be protein concentrate 624 by itself of in combination with concentrates 630 or 630 and 636, in various embodiments illustrated in FIG. 13. A mixer 640 receives the concentrate 608, water, acid and enzymatic cocktail. In one embodiment, the enzymatic cocktail includes enzymes and is composed of a carbohydrate specific cocktail, such as by way of example pectinase, amylase, gluco-amaylase, cellulose, or any other suitable mixture recognized by one skilled in the art.

The mixer 640 mixes the liquids and provides the mixture to a centrifuge 642. In one embodiment, the centrifuge 642 separates the mixture into a water and sugar output 644, leaving protein rich curd 646. The protein rich curd 646 may then be further processed for protein extraction, as described in further detail below.

In another embodiment, the input to the mixer 640 may omit the enzymes. The mixture of the protein concentrate 608, water and acid is then fed to the centrifuge 642. Where the centrifuge 642 extracts the sugar and water 644, the protein rich curd output is then provided to a second processing stage 648. In this embodiment, the second processing stage 648 includes a second mixer 650 and a second centrifuge 652. The protein rich curd is mixed in the second mixer 650 with an acid, and feed to the centrifuge 652. Sugar and water is extracted, to generate a second protein rich curd 654 output. Similar to the protein rich curd 646, the curd 654 is then further processed for protein extraction.

Figure 15:
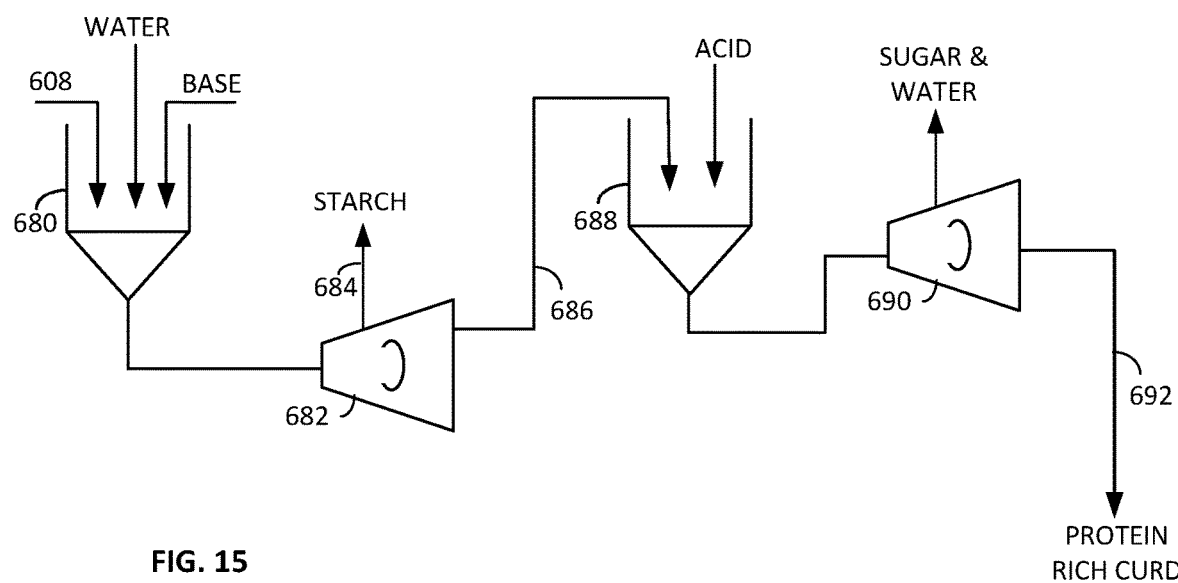
FIG. 15 illustrates another embodiment of protein extraction using dry fractionation.

With respect to FIG. 1, the processing techniques of FIGS. 14-15 are integrated therein. Varying embodiments of protein extraction using the air classification utilize the FIG. 1 processing system 100, including additional or further refinements of the process. For example, with respect to FIG. 14, mixer 640 may operate similar to the mixer 108, therein additionally receiving the enzyme mixture. The centrifuge 642 operates similar to the separator 110, generating the rich protein curd 646, referred to as first protein curd with reference to FIG. 1 above. The wash station 112 of FIG. 1 may operate consistent with the second processing stage 648 of FIG. 12, as further described in FIG. 2 above. Such that the protein rich curd 654 may be consistent with the second protein curd of FIG. 1.

The protein rich curd 646 and/or 654 may be provided to the mixer 114, which includes an enzyme cocktail as noted above.

FIG. 15 illustrates another embodiment for processing the protein concentrate as generated consistent with one or more embodiments above. A mixer 680 receives the protein concentrate 608 along with water and a base. The mixture is fed to a centrifuge 682, whereby starch 684 is extracted. With starch extracted, a solubilized protein rich stream 686 is then fed to a second mixer 688. Within the mixer 688, the stream 686 is combined with acid. The output of the second mixture is fed to a second centrifuge 690, whereby sugar and water is extracted to generate the protein rich curd 692.

FIG. 15 illustrates a similar commonality with the system of FIG. 1, where the mixer 680 operates consistent with the mixer 108 of FIG. 1, having the input of water and base, instead of acid. By replacement of acid with a base, the centrifuge 682 operates similar to the separator 110, to extract the protein curd 686, which is similar to the first protein curd of FIG. 1. The mixer 688 and centrifuge 690 operates similar to the wash station 112 of FIG. 1, whereby the protein rich curd 692 is similar to the second protein curd of FIG. 1.

Similar to the embodiments of FIG. 14, the curd 692 is then further processed for protein extraction, consistent with the above-described techniques. For example, the curd 692 may be fed to the mixer 114 of FIG. 1 with the inclusion of an enzyme cocktail.

As noted herein, wherein the described embodiment of an extraction unit is a centrifuge, it is recognized that any other suitable extraction or separator device may be utilized and the technique herein is not expressly limited to using a centrifuge.

Therefore, the above air classification technique provides for improving protein yield usable for protein extraction from plant-based source(s) such as chickpeas, other legumes and other like feedstocks. A maximum protein concentration is reached in which no further protein can be concentrated without sacrificing yield, or in various embodiments a maximum cannot be overcome due to particles or agglomerates having the same mass cannot be separated in a dry media. The present technique therein introduces materials into a solvent to separate materials by other physio-chemical properties.

It is recognized that varying the processing conditions noted above adjusts the output volume and concentrate levels. Whereas within the scope of the present invention, reducing processing time or reducing ingredient combinations may generate reduced concentration levels acceptable for varying industrial or commercial uses. Similarly, refinements may include increased quality or other attributes of the protein concentrate, such as digestibility, after taste/aromatics, consistency, mouth-feel, by way of example. As such, the varying operational variations are within the scope of the present invention and the noted example and ranges above are exemplary and not limiting in their disclosure.

In addition the method and system described herein, the present method and system additionally allows a chickpea concentrate made by the process described herein. The chickpea concentrate is made, in various embodiments, using the above described methods and systems.

Therefore, the present method, system and chickpea concentrate overcomes the limitations of the prior art by allow for the utilization of chickpea as a vital protein source. The method and system incorporate varying operational guidelines, such as acidity levels, processing times, flow rates, temperature ranges, to generate the herein described chickpea concentrate.

FIGS. 1 through 15 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

The invention claimed is:

1. A method for de-oiling and extracting protein from chickpeas prior to generating chickpea protein concentrate, the method comprising:
   receiving a chickpea flour generated from a plurality of chickpeas;
   generating an ethanol mixture by mixing the chickpea flour with ethanol to remove at least a portion of the oil content from the chickpea flour while absorbing at least a portion of organics from the chickpea flour into the ethanol mixture;
   separating the ethanol mixture into a de-oiled chickpea flour and an ethanol recycling stream having the at least a portion of the organics from the chickpea flour absorbed in the ethanol recycling stream; and
   extracting a protein concentrate from the de-oiled flour.

2. The method of claim 1, further comprising:
   generating the chickpea flour using a roller mill and flaker including removing a cortex material from the plurality of chickpeas, whereby the flour includes flakes therein.

3. The method of claim 2 further comprising:
   prior to extracting the protein concentrate, milling the de-oiled flour and the protein concentrate therefrom.

4. The method of claim 1 further comprising:
   generating the chickpea flour using a flour mill, including removing a cortex material from the plurality of chickpeas.

5. The method of claim 1, wherein the mixing of the ethanol mixture is performed using a mix tank and the separating the ethanol mixture is performed using a centrifuge.

6. The method of claim 1 further comprising:
   prior to extracting the protein concentrate, drying the de-oiled chickpea flour.

7. The method of claim 6, wherein drying the de-oiled chickpea flour prior to extracting the protein concentrate is performed using at least one of: an air-flow dryer; a vacuum dryer; and a desolventizing toaster in combination with a vacuum dryer.

8. The method of claim 1 further comprising:
   feeding the ethanol recycling stream to an ethanol recycling unit to extract the ethanol therefrom.

9. A method for extracting protein from a plant-based source material the method comprising:
   milling the plant-based source material to generate a milled flour;
   generating an ethanol mixture by mixing the milled flour with ethanol;
   removing at least a portion of an oil content of the plant-based source material from the mixing of the milled flour with the ethanol;
   separating the ethanol mixture into a de-oiled flour and an ethanol recycling stream the ethanol recycling stream including the at least a portion of the oil content of the plant-based source material;
   milling the de-oiled flour to generate milled de-oiled flour; and
   generating a protein concentrate from the milled flour using an air classifier.

10. The method of claim 9 further comprising:
    processing the protein concentrate to generate a protein rich curd;
    generating a neutral hydrolyzed protein slurry by mixing the protein rich curd with a base, an enzymatic cocktail, and water;
    generating a homogenized protein slurry from the neutral hydrolyzed protein slurry;
    generating a cooled protein slurry by pasteurizing the homogenized protein slurry; and
    extracting a protein concentrate product from the cooled protein slurry.

11. A method for removing oil from a source material and generating a protein concentrate, the method comprising:
    decorticating the source material, the source material having a protein and an oil content therein, the decorticating removing cortex material from the source material;
    creating a flour from the source material having the cortex material removed therefrom;
    generating an ethanol mixture by mixing the flour with ethanol in a mix tank;
    removing at least a portion of the oil content from the flour using the ethanol mixture in the mix tank;
    removing at least a portion of sugars from the flour using the ethanol mixture in the mix tank;
    extracting a de-oiled flour from the ethanol mixture;
    extracting at least a portion of the ethanol from the ethanol mixture, the portion of the ethanol extracted from the ethanol mixture including the oil content and the sugars removed from the flour;
    drying the de-oiled flour using at least one dryer; and
    extracting a protein concentrate from the de-oiled flour.

12. The method of claim 11, wherein the step of creating the flour is performed using a roller mill and flaker, whereby the flour includes flakes therein.

13. The method of claim 12 further comprising:
    milling the de-oiled flour, which includes milling the flakes therein.

14. The method of claim 11, wherein creating the flour is performed using a flour mill.

15. The method of claim 11, wherein the at least one dryer includes one or more of: an air-flow dryer; a vacuum dryer; and a desolventizing toaster in combination with a vacuum dryer.

16. The method of claim 11 further comprising:
    feeding the ethanol extracted from the ethanol mixture, in combination with the oil and the sugars, to an ethanol recycling unit to extract the ethanol therefrom.

17. The method of claim 11, wherein the source material is chickpeas.

* * * * *